(12) United States Patent
Ghosh et al.

(10) Patent No.: US 9,227,853 B2
(45) Date of Patent: Jan. 5, 2016

(54) DESALINATION UNIT FOR THE PRODUCTION OF POTABLE WATER FROM SUB-SOIL BRINE

(75) Inventors: Pushpito Kumar Ghosh, Gujarat (IN); Girish Rajanikant Desale, Gujarat (IN); Bhavin Hasmukhlal Khatri, Gujarat (IN); Rajeshkumar Naranbhai Patel, Gujarat (IN); Sanatkumar Natavarlal Patel, Gujarat (IN); Jayanta Kumar Pothal, Gujarat (IN); Niitin Ganesh Borle, Gujarat (IN); Mahesh Ramjibhai Gajjar, Gujarat (IN); Hiteshbhai Mohanbhai Tadvi, Gujarat (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 273 days.

(21) Appl. No.: 13/641,226

(22) PCT Filed: Apr. 19, 2011

(86) PCT No.: PCT/IB2011/000851
§ 371 (c)(1),
(2), (4) Date: Jan. 25, 2013

(87) PCT Pub. No.: WO2011/132053
PCT Pub. Date: Oct. 27, 2011

(65) Prior Publication Data
US 2013/0118888 A1    May 16, 2013

(30) Foreign Application Priority Data

Apr. 19, 2010    (IN) .............................. 932/DEL/2010

(51) Int. Cl.
*C02F 1/16*    (2006.01)
*B01D 1/16*    (2006.01)
(Continued)

(52) U.S. Cl.
CPC ............... *C02F 1/16* (2013.01); *B01D 1/0058* (2013.01); *B01D 3/00* (2013.01); *B01D 5/006* (2013.01);
(Continued)

(58) Field of Classification Search
CPC ...... B01D 1/0058; B01D 1/04; B01D 1/0076; B01D 1/0082; B01D 1/16; B01D 1/20; B01D 5/0075; B01D 3/00; B01D 5/006; B01D 5/0015; C02F 1/048; C02F 1/12; C02F 1/16; C02F 2103/06; C02F 2103/08; C02F 2303/10; F28D 2021/0084–2021/0085; F28F 21/08; F28B 1/02; F01K 11/00; F01K 17/00; F01K 3/02; F01K 9/00; F01K 23/00; F01K 7/34; Y10S 60/912; Y10S 159/15; Y10S 159/23; Y10S 159/39; Y10S 202/00; Y10S 203/08; Y10S 203/17; Y10S 203/18; Y10S 203/90

See application file for complete search history.

(56) References Cited

U.S. PATENT DOCUMENTS 2,384,226 A * 9/1945 Worthen et al. ............... 202/194
2,446,880 A * 8/1948 Kleinschmidt ............... 202/187
(Continued)

FOREIGN PATENT DOCUMENTS

CN    201660459 U    12/2010
WO    WO 2006/022507 A1    3/2006
(Continued)

OTHER PUBLICATIONS

Subramanyam, "Waste Heat Recovery," Bureau of Energy Efficiency, Feb. 2005, pp. 1-18.
(Continued)

*Primary Examiner* — Virginia Manoharan
(74) *Attorney, Agent, or Firm* — Oliff PLC

(57) ABSTRACT

A desalination unit for production of potable water from sub-soil brine including in combination a trapezoidal basin, a condenser, a feed tank, a header, a heat exchanger, a flush valve, a sprinkling system, exhaust heat pipe and water collecting channel; where the exhaust heat pipe is connected to a heat source at one end and to the header at the another end, the header being coupled with the heat exchanger to provide the heat flow, and the heat exchanger being fitted at the inner portion of the trapezoidal basin to heat the sub-soil brine.

9 Claims, 5 Drawing Sheets

(51) Int. Cl.
   *B01D 3/00*       (2006.01)
   *F01K 11/00*      (2006.01)
   *B01D 1/00*       (2006.01)
   *B01D 5/00*       (2006.01)
   *C02F 1/04*       (2006.01)
   *C02F 1/12*       (2006.01)
   *C02F 103/06*     (2006.01)

(52) U.S. Cl.
   CPC .............. *B01D 5/0015* (2013.01); *C02F 1/048* (2013.01); *F01K 11/00* (2013.01); *C02F 1/12* (2013.01); *C02F 2103/06* (2013.01); *Y10S 203/08* (2013.01); *Y10S 203/17* (2013.01)

(56) References Cited

U.S. PATENT DOCUMENTS

| | | | |
|---|---|---|---|
| 2,643,974 A * | 6/1953 | Impagliazzo | 202/163 |
| 3,884,768 A * | 5/1975 | Griffith | 203/11 |
| 4,059,959 A * | 11/1977 | Matthews | 60/641.4 |
| 4,882,009 A * | 11/1989 | Santoleri et al. | 159/4.2 |
| 7,513,972 B2 * | 4/2009 | Hart et al. | 159/47.3 |
| 2004/0099521 A1 * | 5/2004 | Demers et al. | 203/1 |
| 2006/0272933 A1 * | 12/2006 | Domen et al. | 203/10 |
| 2007/0084778 A1 | 4/2007 | St. Germain et al. | |

FOREIGN PATENT DOCUMENTS

| | | |
|---|---|---|
| WO | WO 2008/058242 A2 | 5/2008 |
| WO | WO 2009/157875 A1 | 12/2009 |

OTHER PUBLICATIONS

Saari, "Usability of Low Temperature Waste Heat for Sea Water Desalination," *Desalination*, 1981, vol. 39, pp. 147-158.
http://www.brighthub.com/engineering/marine/articles/29189.aspx.
International Search Report issued in International Patent Application No. PCT/IB2011/000851 dated Aug. 3, 2011.

* cited by examiner

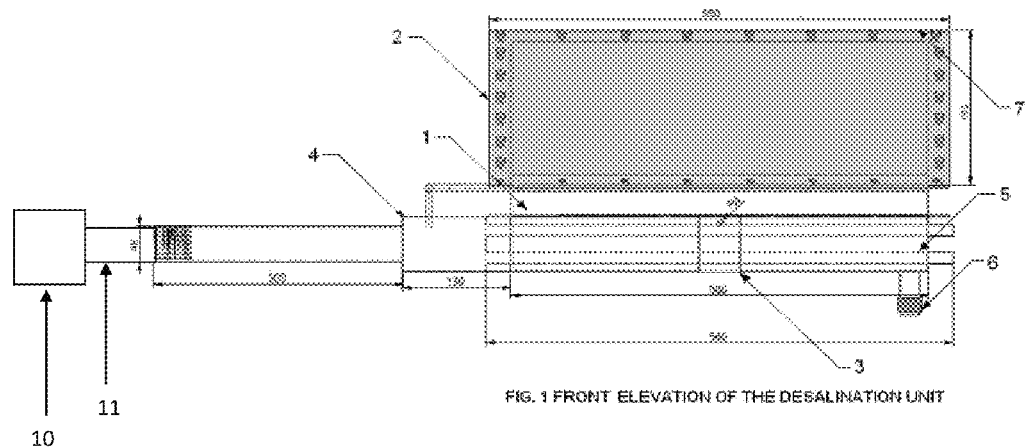
FIG. 1 FRONT ELEVATION OF THE DESALINATION UNIT
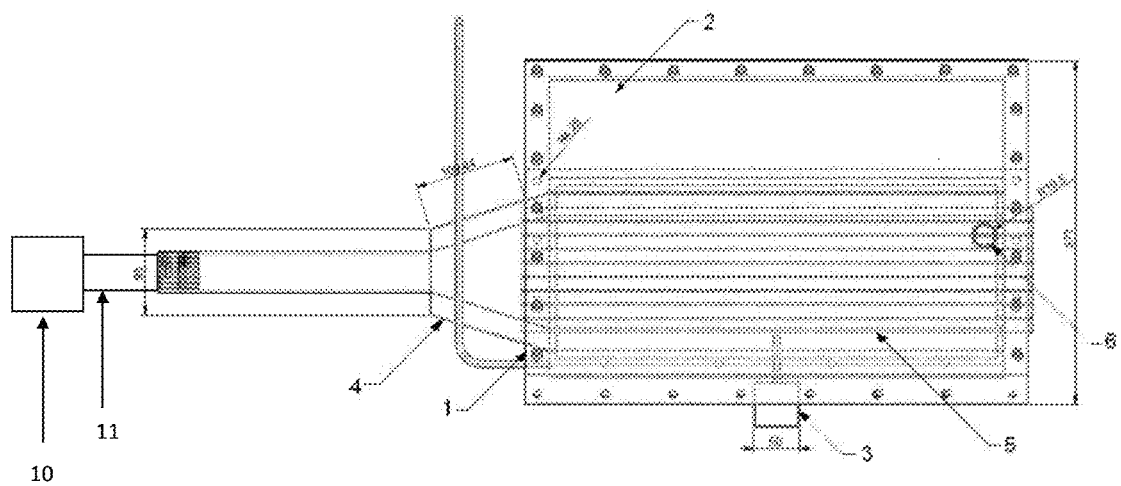
FIG. 2 TOP ELEVATION OF THE DESALINATION UNIT

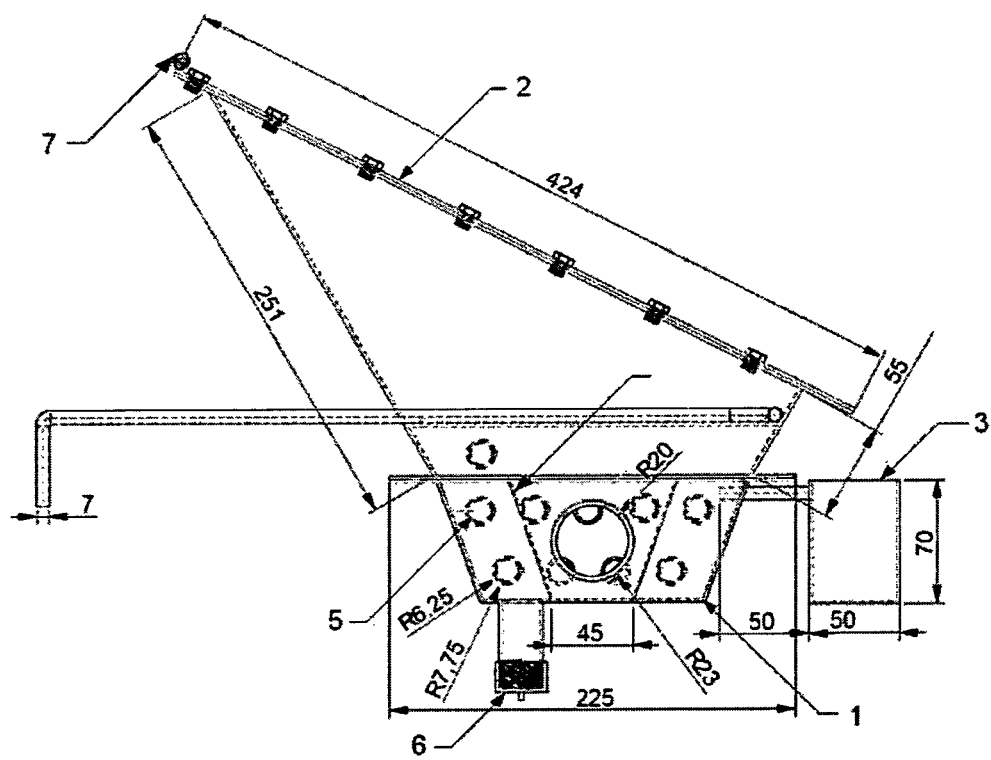
FIG. 3 SIDE ELEVATION OF THE DESALINATION UNIT

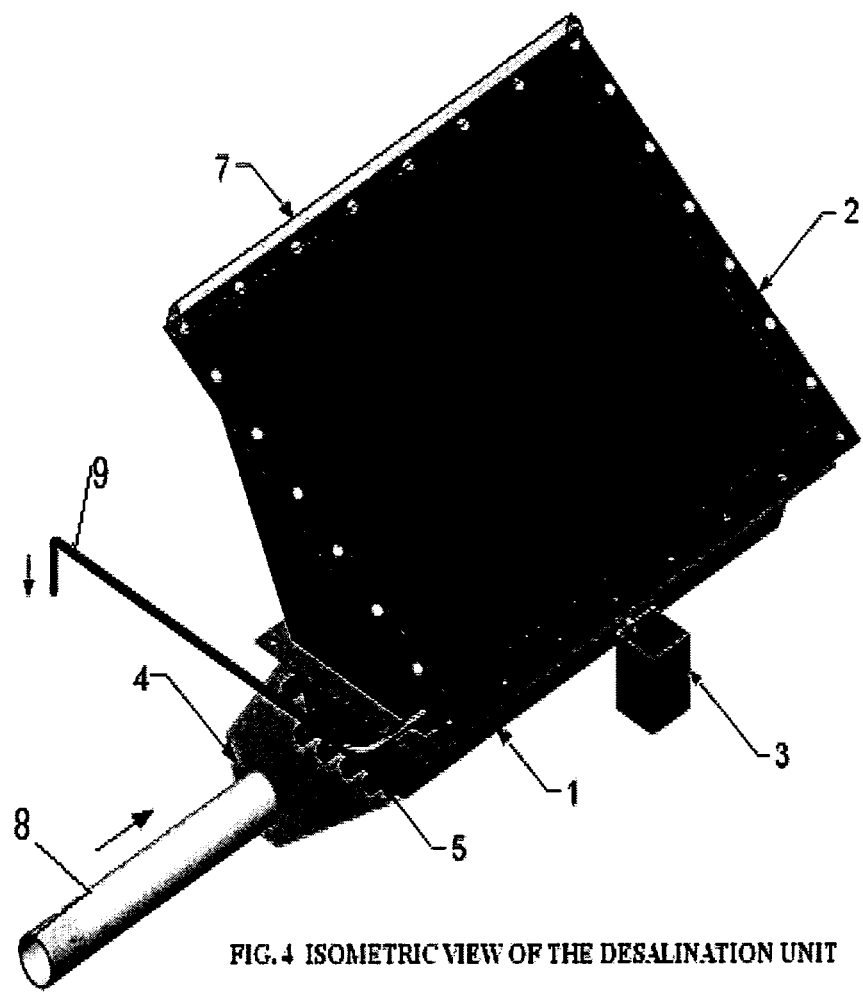
FIG. 4 ISOMETRIC VIEW OF THE DESALINATION UNIT

DESALINATION UNIT FOR THE PRODUCTION OF POTABLE WATER FROM SUB-SOIL BRINE

FIELD OF INVENTION

The present invention relates to a desalination unit for production of potable water from sub-soil brine, particularly the present invention relates to a desalination unit for the production of drinking water from sub-soil brine using exhaust waste heat from diesel engine, more particularly, the invention relates to a sustainable and standalone method of obtaining drinking/cooking water in inexpensive manner in far flung areas utilising the resources at the disposal of the salt workers.

BACKGROUND AND PRIOR ART

Many salt farms in India are located in the remote desert area known as the Little Rann of Kutch. These salt farms are typically manned by marginal workers and are mostly devoid of basic facilities such as electricity, transportation, clean water, etc. In these areas, the available ground water is salty (brine) which is a gift of nature for salt manufacturers. However, this invites the other difficulty with challenges for survival due to scarcity of drinking water. The salt producers sometimes have to travel long distances in search of potable water. Occasionally, drinking water is provided through tankers from sources far away from the salt farms. The supply, unfortunately, is not always regular and there are times when the land becomes so slushy that vehicles cannot ply. There is thus a need for an alternative and more dependable solution.

Techniques of desalination such as reverse osmosis and electrodialysis are good solutions when the water has salinity below that of seawater but become impractical solutions when the salinity of water is high as is the case with most sub-soil brines. Moreover, being in distant locations, salt farms often do not have electricity connection whereas power is required to drive the above units. On the other hand, operation through solar power, etc., is a costly proposition even if it were to be technically feasible.

The normal thermal desalination techniques require large inputs of fuel besides high capital cost and cumbersome size. These too are therefore unsuitable for such remote locations and unsophisticated users.

Solar stills have been used occasionally in salt farms to convert the saline water into drinking water. In such stills the average production rate is around 0.8 liters per square meter per sun hour. These could not become much popular in salt farms due to their low productivity.

The essential quality of heat is not the amount but rather its "value". The strategy of how to recover this heat depends in part on the temperature of the waste heat gases and the economics involved.

Large quantity of hot flue gases is generated from boilers, kilns, ovens and furnaces. If some of this waste heat could be recovered, a considerable amount of primary fuel could be saved. The energy lost in waste gases cannot be fully recovered. However, much of the heat could be recovered and loss minimized by adopting suitable techniques.

Industrial units are typically designed incorporating heat recovery units to improve the overall thermal efficiency of the system. A common utilization of this principle is in systems which have an exhaust stream or waste stream which is discharged from the system to its surroundings. Thermal energy is often recovered from liquid or gaseous waste streams to fresh make-up air and water intakes in buildings, such as for heating, ventilation and air conditioning (HVAC) systems, or any process systems.

Typical waste heat sources and their temperature range released in atmosphere are given in Table 1. Flue gas at 450° C. is used in the Waste Heat Recovery Boiler (WHRB) to produce process steam. The large quantity of lower temperature waste heat from the engine cooling system (jacket cooling water, oil cooler and inlet air cooler) will be used to preheat to about 110° C. the feed water to the WHRB to increase its efficiency and produce more steam. The existing cooling tower will be replaced with heat exchangers and a de-aerator will be added for non-condense gases removal and further preheating of the WHRB feed water temperature to 130° C. which increases the system efficiency even more. The waste heat in the form of flue gases from thermal power plants and decentralized electricity generating sets are employed occasionally for processes requiring thermal energy. This directly reduces fuel costs and combustion emissions significantly, and further benefits the environment, albeit to a lesser degree, through reduced amount of effluents and reduced exhaust temperatures [Subramanyam, Waste heat recovery, Bureau of Energy Efficiency, February 2005, pp. 1-18].

TABLE 1

Typical waste heat sources and temperature

| Source | Temperature (° C.) |
|---|---|
| Steel heating furnaces | 925-1050 |
| Steam Boiler Exhausts | 230-480 |
| Gas Turbine Exhausts | 370-540 |
| Reciprocating engine exhausts | 325-600 |
| Heating treating furnaces | 425-650 |
| Internal Combustion Engines | 66-120 |
| Hot Processed Liquids | 32-232 |
| Welding Machines | 32-88 |
| Air compressors | 27-50 |
| pumps | 27-88 |

Reference may be made to Journal "Usability of low temperature waste heat for sea water desalination", 1981, 39, 147-158, Risto Saari, a multi-effect-distillation unit is used for desalination of sea water using waste heat having 50° C. higher temperature than atmosphere. The energy that is cooled away from a process—appears at two very different temperature levels. This article states that even for temperatures less than 20° C. above the ambient temperature, waste heat can be technically and economically utilized.

Many other investigators have used waste heat to produce make-up water for different purposes like make-up, heating, cooling and drinking from sea water. Raha et al. (International Journal of Nuclear Desalination—2007, 2, 342) utilised waste heat to produce desalinated water by low-temperature evaporation (LTE) desalination technology. Low-pressure steam (0.13 bar) and even hot water ($\Delta T\sim 50°$ C.) has been used to produce high-purity water directly from seawater. LTE technology has found major applications in nuclear reactors to produce high-quality desalted water for make-up water requirements.

Reference may be made to US Patent Application No. 2007084778 A1 by S. T. Germain discloses a power generation system consisting of gas turbine for the production of electricity. A desalination system for production of potable water from sea water is attached to the exhaust of gas turbine. This desalination system comprises heat recovery steam generator and a condenser to condense the steam. Thus the system has dual functioning like power generation and to create a source of fresh water from sea water.

Reference may be made to Chinese patent No. CN201660459 by Huang discloses sea water desalination using the engine exhaust heat interchanger by overheating the sea water used for engine cooling. The water is circulated using a pump. The unit is claimed to be useful in ships.

Reference may be made to the web site http://www.brighthub.com/engineering/marine/articles/29189.aspx discloses a system wherein hot water from water cooled diesel engine is passed through the evaporator which is at low pressure and steam is generated. This steam is passed through steam separator and further passed to condenser to get fresh water which is extracted with the help of a pump.

Although the prior art above teaches us the utilization of waste heat for desalination, the units are typically fairly large units having sophisticated operation and requiring additional devices/electrical power for running different types of pumps. None of the prior art teaches the utilization of waste heat from small capacity air cooled diesel engines for desalination of highly saline—up to 3-5 times seawater salinity—sub-soil brine for the purpose of meeting drinking water needs of marginal salt workers in cost-effective manner in remote locations who have to otherwise struggle to procure drinking water.

Diesel engines are used to run pumps in salt works mainly to pump the sub-soil brine from high depths. Invariably all salt workers in places such as the Little Rann of Kutch possess such diesel engines to conduct their work of producing salt. The exhaust gas of a typical diesel engine is emitted at temperatures in excess of 150° C. and no use is made presently of this energy in such salt works. The present invention discloses the design of a device which enables this energy to be utilised gainfully for the production of potable water from highly saline brines in cost effective manner and at a rate in excess of that achievable through a solar still of similar size.

OBJECTS OF THE INVENTION

The main object of the present invention is to provide a desalination unit for the production of potable water from sub-soil brine.

Another object of the present invention is to provide a source of drinking water at salt farms located in remote areas using only the resources available at the site.

Yet another object of the present invention is to utilise the brine used for salt production as the source of water.

Yet another object of the present invention is to provide a small family with 20-40 liters of drinking and cooking water per day.

Yet another object of the present invention is to utilize the waste exhaust heat energy from diesel engine to effect thermal desalination.

Yet another object of the present invention is to recognise that such diesel engines during the salt production period are operated round the clock and that the required amount of water can be obtained through a unit that produces 1-2 liters of drinking water per hour.

Yet another object of the present invention is to provide a unit which will not reduce the engine power and brine pumping efficiency as a result of the add on unit.

Yet another object of the present invention is to provide a unit as a simple attachment without changing the existing diesel pump set-up used by the salt manufacturers.

Yet another object of the present invention is to design the single unit which consists of a brine storage trapezoidal basin with minimum storage capacity while at the same time ensuring the above desired drinking water output.

Yet another object of the present invention is to feed brine into the trapezoidal basin at the same rate as drinking water is produced to maintain a steady output.

Yet another object of the present invention is to have a flushing device to ensure that salt concentration does not build up excessively in the system.

Yet another object of the present invention is to ensure that there is no contact between the flue gas and the brine to avoid contamination of the brine and, consequently, of the water produced.

Yet another object of the present invention is to design an appropriate heat exchanger to ensure maximum utilisation of the waste heat to maximise evaporation efficiency.

Yet another object of the present invention is to have an air-tight metallic condensing unit of high surface area fixed onto the trapezoidal basin to maximise the condensation efficiency.

Yet another object of the present invention is to recognise that the sub-soil brine temperature is substantially lower than the day time temperature and to flow such brine over the condenser to maximise the condensation of vapours.

Yet another object of the present invention is to recognise that many of these production sites have rather chilly nights which allows for more efficient condensation at night while retaining the same efficiency of evaporation through effective thermal insulation of the evaporator.

Still another object of the present invention is to fabricate the unit such that it can be easily opened by unskilled persons for the purpose of cleaning the inside of the unit once a day and particularly for the removal of scales.

SUMMARY OF THE INVENTION

The present invention provides a desalination unit for the production of potable water from sub-soil brine comprising in combination a trapezoidal basin (1), a condenser (2), a feed tank (3), a header (4), a heat exchanger (5), a flush valve (6), a sprinkling system (7), exhaust heat pipe (8) and water collecting channel (9); wherein the said exhaust heat pipe being connected to a heat sources (10) at one end and to the said header at the another end, the said header being coupled with the said heat exchanger to provide the heat flow, the said heat exchanger being fitted at the inner portion of the said trapezoidal basin to heat the sub-soil brine, the said trapezoidal basin being covered with the said condenser to trap the vapour produced from the sub-soil brine, the said trapezoidal basin being further attached to the said feed tank to maintain the sub-soil brine level and having the said flush valve at the bottom to drain the concentrated sub-soil brine, the said condenser being attached with the said sprinkling system at the top to spray the sub-soil brine to make the condenser cool during the condensation, the condense water droplets being collected through the said water collecting channel provided inside the condenser to produce potable water.

Accordingly, the present invention provides a desalination unit for production of potable water from sub-soil brine, said unit comprising:

a trapezoidal basin (1) for containing the sub-soil brine;

a heat exchanger (5) comprising a plurality of horizontal metallic pipes disposed inside the said basin (1) and parallel to the length of the basin (1); said metallic pipes of the heat exchanger (5) are coupled with an exhaust port (11) of a heat source (10) via an exhaust heat pipe (8) to receive hot exhaust gases and transfers the heat to the brine contained in the basin (1) thereby resulting in vaporization of the sub-soil brine;

a feed tank (3) coupled with the said trapezoidal basin (1) for maintaining level of sub-soil brine in the trapezoidal basin;

a flush valve (6) provided at bottom of the trapezoidal basin for draining the concentrated sub-soil brine;

a condenser (2) comprising a top wall and side walls, being mounted on top of the said trapezoidal basin (1) so as form a closed chamber over the said basin to trap the vapour produced from the sub-soil brine; the side walls of the said condenser are constructed so that the condenser have a variable cross section with increasing cross-sectional area from bottom to top;

a sprinkling system (7) disposed on outer surface of the top wall of the condenser for spraying relatively cool subsoil brine to make the condenser cool;

a water collecting channel (9) being disposed horizontally on inner surface of the side walls of the condenser for collecting water.

In an embodiment of the present invention the metallic pipes are coupled with a header (4) which connected with the exhaust pipe (8) whose one end is connected with exhaust port of a heat source and other end is connected with the header.

In another embodiment of the present invention the feed tank maintains the level of sub-soil brine in the said basin by difference in level.

In still another embodiment of the present invention the condenser sprinkling system (7) comprising a pipe with plurality of holes, said pipe is disposed on outer surface of the top wall of condenser for sprinkling relatively cool brine on the top wall of the condenser for cooling the walls condenser during condensation.

In yet another embodiment of the present invention the water collecting channel (9) is connected with a horizontal pipe to taking out potable water from the condenser.

In an embodiment of the present invention the heat source used is a 5 HP air cooled diesel engine.

In another embodiment of the present invention the metallic pipes are thermally conducting pipes arranged in parallel or concentric form.

In yet another embodiment of the present invention the thermally conducting pipes is made of material selected from a group consisting of copper, stainless steel or aluminium.

In yet another embodiment of the present invention the length to diameter ratio of the thermally conducting pipe is in the range of 300 to 400.

In yet another embodiment of the present invention the materials used in the unit are selected from a group consisting of stainless steel, aluminium or PVC.

In yet another embodiment of the present invention the unit facilitate the heat transfer without any back pressure at the exhaust heat pipe of the heat source.

In yet another embodiment of the present invention the unit used is capable to produce potable water in the range of 1.5 to 2.0 liters per hour.

In yet another embodiment of the present invention the flush valve at the bottom of the trapezoidal basin is used to avoid the salt deposition on the heat exchanger and inner portion of the trapezoidal basin.

In still another embodiment of the present invention the unit is cost effective, rugged and amenable to operate and easy to maintenance.

BRIEF DESCRIPTION OF DRAWINGS

FIGS. 1-7 of the drawing illustrates the present invention accompanying this specification.

FIG. 1 illustrates the front elevation of the desalination unit with engine exhaust heat utilization according to an embodiment of the present invention.

FIG. 2 illustrates the top elevation of the desalination unit shown in FIG. 1.

FIG. 3 illustrates the side elevation of the desalination unit shown in FIG. 1.

FIG. 4 illustrates the three dimensional view of the desalination unit shown in FIG. 1.

FIG. 5 shows variation in the temperature of sub-soil brine at different locations in the basin with respect to time.

FIG. 6 Variation in the temperature of sub-soil brine with condensing unit

FIG. 7 Production of distilled (potable) water with respect to time.

DETAILED DESCRIPTION OF THE PRESENT INVENTION

Figure 5:
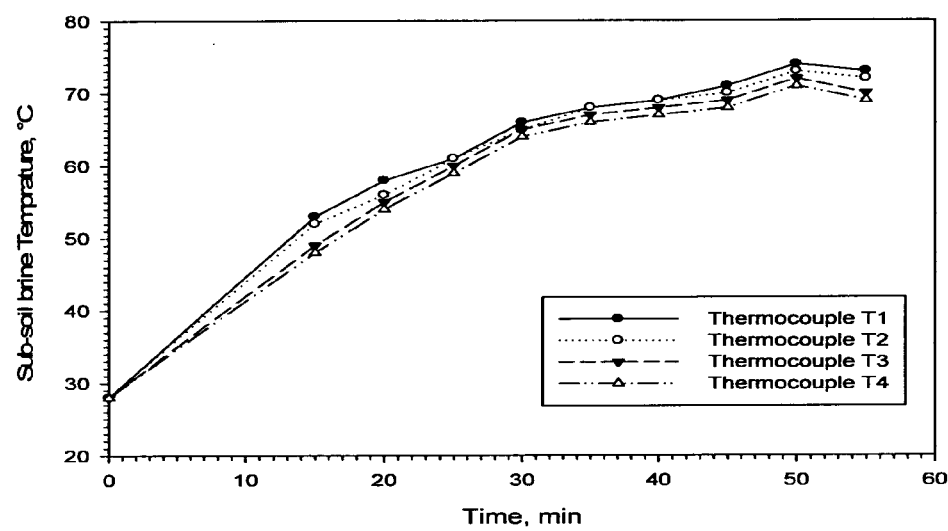

Accordingly, the present invention provides a desalination unit utilizing heat of an engine exhaust for production of drinking water from sub-soil brine. The unit comprises an evaporator to heat the sub-soil brine and a condenser for condensing the vapour generated in the evaporator. In an embodiment of the present invention the evaporator is a trapezoidal shape basin. Plurality of metallic pipes is disposed in the evaporator or in the trapezoidal basin. In an embodiment of the present invention, the metallic pipes are thermally conductive arranged in parallel or concentric form. The metallic pipes can be made of material selected from copper, aluminium or stainless steel, preferably copper. One end of the trapezoidal basin is connected to the exhaust port of a diesel engine so that exhaust gases generated from the diesel engine is supplied through the copper pipes. The sub-soil brine is contained in the trapezoidal basin used as feed water while the copper pipes along the length of the tank are used to flow exhaust gases and transfer the heat from the exhaust to the feed water.

According to an embodiment, the desalination unit of the present invention comprises a condenser. The condenser can be made of aluminium sheet and provided with internal channels. The condenser is a chamber which is closed from tope and can be fixed on the trapezoidal basin (evaporator) to trap the vapours of sub-soil brine. A PVC pipe with number of small holes on its periphery is fixed on top of the condenser to spray relatively cool sub-soil brine over the condenser surface. The relatively cool sub-soil brine has capacity to extract the heat from condenser surface and allow the vapours to condense on the inner surface of condenser. The size of the condensed water drops increases with time and as the size of water drops increase beyond a certain size, water droplets roll down on the inner surface of the condenser due to gravity and finally, accumulate in the channels provided on the inner surface of the condenser for collecting the distilled water.

The level of sub-soil brine in the trapezoidal basin decreases continuously with time and to maintain the performance of the unit it is necessary to maintain the level of sub-soil brine. A small feed tank is attached to the trapezoidal basin. A part of the feed brine in the tank is used for the purpose of sprinkling on the condenser surface and a part is fed in the trapezoidal basin to maintain its level. Evaporation of sub-soil brine and addition of fresh sub-soil brine gradually increases the salt concentration inside the trapezoidal basin inviting the problem of salt deposition which can decrease the performance of the unit. To overcome this problem, a flush valve is attached to the trapezoidal basin for flushing out the concentrated sub-soil brine after 4-5 hours of operation.

The present invention provides a unit used for desalination of sub-soil brine using heat of the exhaust gases of the diesel engine. Thus, to transfer the required amount of heat from exhaust gas to sub-soil brine heat transfer calculations and selection of suitable material is required and done with the help of the equations (1)-(13).

Mass flow rate of exhaust gas is taken as 0.007147 kg/s, Exhaust gas temperature at inlet is approximate 150° C. and at outlet is 50° C. ($\Delta T=100°$ C.). Inner and outer diameters of the copper tubing were taken as 12.5 mm and 15.5 mm, respectively. From the calculations, the length of copper tube (L) required was determined to be 4 m to make the unit compact this length was achieved by introducing 9 copper pipes in parallel, each of 0.5 m length.

FIGS. 1-4 illustrate a desalination unit of the resent invention in accordance of an embodiment of the present invention. As shown in FIG. 1, the desalination unit comprises a an evaporator basin (1) made of stainless steel, a condenser (2) made of aluminium sheet, feed tank (3) made of from aluminium sheet, a header (4) made of stainless steel, heat exchanger (5) made out of copper pipes, flush valve (6) made out of PVC or stainless steel, sprinkling system (7) made of PVC pipe, exhaust heat pipe (8) and water collecting channel (9).

As can be observed from FIGS. 1-4, the evaporator is a trapezoidal basin (1) which can be made of stainless steel (S.S. 316) so as to contain the sub-soil brine. The trapezoidal basin is provided with plurality of copper pipes disposed in horizontally and parallel to the length of basin (as shown in FIG. 2). Inlet portion of the copper tubes is fixed to a header (4) which is coupled to the exhaust of a diesel engine. Other end of the copper tubes is open to atmosphere. The exhaust gas from diesel engine flows through the copper tubes which heats up the copper tubes. Heating of copper tubes further heats up the sub-soil brine contained inside the basin which initiates the vaporization of the sub-soil brine. A shown in FIG. 3, the trapezoidal basin has a trapezoidal cross section with smaller dimension at bottom and a larger dimension on top. In other words, the basin (1) gets narrower as we move from top to bottom in the basin. Therefore, the brine contained in the basin has large surface area which facilitates faster evaporation. Also as the basin is narrower at the bottom which facilitate heat transfer between the copper pipes and brine.

As shown in FIGS. 1-4, the trapezoidal basin is covered with a chamber which is closed from top to trap the vapour produced from sub-soil brine. The said closed chamber acts as a condenser (2) (see FIG. 3). In an embodiment of the present invention the condenser is constructed using 2 mm thick aluminium sheet. Two horizontal channels along the length of the condenser are provided on inner surface of the condenser (2) to collect the distilled water.

As shown in FIG. 3, the condenser is a chamber comprising a closed top wall and side wall. The said chamber is open at the bottom which connected on the top surface of the trapezoidal basis to receive vapours generating due to vaporization of the brine. As shown in FIG. 3, top wall of the condenser is mounted in a slant or inclined manner so that large surface are can be made available for condensation of the vapour. For this purpose, the side walls of the condenser are made of different sizes. In other words, height of two side walls are made of different size (i.e. one side is taller than its opposing side so that the top surface can be mounted on the side walls in an inclined manner. The side walls are also mounted in slant or inclined manner so that chamber/condenser has variable cross section with increasing cross section area as we move from bottom to top. Due to the increasingly variable cross sectional area of the chamber from bottom to top, the top wall provides a large surface area. Also, the slant side walls of the condenser provide large surface area for condensation of vapours. The vapours gets condensed on the inside slant surfaces (i.e. inner surface of top wall and side walls) of condenser and rolled down and finally collected from the channels.

Due to continuous evaporation of sub-soil brine and its condensation, the level of sub-soil brine in the basin decreases, thus to maintain the level of sub-soil brine a small feed tank (3) is attached to the basin (as shown in FIGS. 2 and 3). The level inside the basin is maintained due to level difference in the basin and the feed tank. As the level in the basin reduces, the brine from the feed tank starts dripping in the basin. As can be understood from the FIG. 3, the level of brine in the basin can be maintained by maintaining the level of brine in the feed tank from outside, In an embodiment of the present invention the header (4) (as shown in FIG. 2) can be made of stainless steel. The header (4) is mainly to distribute the exhaust gases generated from engine exhaust port to the copper pipes (5). The copper pipes acts as heat exchanger. In an embodiment of the invention the heat exchanger is made of nine copper tubes which are fitted in the trapezoidal basin (1) used to carry the exhaust gas and transfer the heat from exhaust gas to the sub-soil brine. The header is connected with the exhaust port by an exhaust heat pipe (8) (as shown in FIG. 4).

Due to continuous evaporation of sub-soil brine the concentration of sub-soil brine increases and may lead to deposition of salt inside the basin and on copper tubes (5). This decreased the heat transfer rate which may lead to decrease the performance of the unit. Thus to overcome this problem a flush valve (6) is attached to drain the concentrated sub-soil brine after certain interval of time. The size of the flush valve can be one inch and the flush valve can be fitted to the bottom of the trapezoidal basin (1) to drain the concentrated brine.

Referring to FIG. 3, to increase the condensation of vapours a sprinkling system (7) is provided at the top (i.e. on the outer surface of top wall) of the condenser (2). The sprinkling system comprises a small pipe with number of small holes which sprays the sub-soil brine to cool the condenser surface (i.e. top wall and adjoining side walls) for condensation of vapours.

As described in previous paragraphs, the condensation of the vapours takes place on inner surface (i.e. inner surface of top and side walls) of the condenser. As the size of the water droplets increases, the water droplets roll down due to gravity. For collecting water droplets, a horizontal channel (9) is provided on inner surface of the side walls of the condenser as shown in FIG. 4). The said horizontal channel is extended out of the condenser in the form of a horizontal pipe for taking collecting water from the condenser. In other words, a pipe can be connected with the said channel (9) for collecting water from the condenser.

Generally, in salt works in remote locations such as the Little Rann of Kutch, which depend on sub-soil brine for salt production, a 5 HP vertical type single cylinder air cooled or water cooled diesel engine is used to pump sub-soil brine having in excess of 35,000 ppm salinity and more typically salinity in the range of 100,000 to 200,000 ppm. The exhaust gas from diesel engine, having temperature >150° C., is passed through parallel heat exchangers made out of copper for efficient heat transfer from gas to brine. Minimum volume of brine, with maximum surface area for evaporation, is taken for this purpose in a small trapezoidal basin. The brine temperature reaches around 90° C. and gets evaporated. This trapezoidal basin is closed with an aluminium sheet cover to collect the vapour formed. The top cover having high surface area works as condenser, such condensation being further facilitated by sprinkling continuously the sub-soil brine of temperature around 22-25° C. over the condenser. Due to this temperature difference the vapours gets condensed on the inner surface of the closed tank. The condensed drops get rolled down on the inner surface of condenser and are collected through a channel provided inside the condenser. The water finally makes its way into earthen goblets to keep it cold and to give a refreshing taste. Fresh brine seeps into the evaporation chamber at the same rate that water is taken out from the system through the evaporation-cum-condensation system. The design avoids escape of vapour and entry of air from outside. Provision is made for intermittent flushing of the unit with fresh brine to prevent excessive build of salinity which would lead to scale formation.

The main inventive steps of the present invention are the following:
1. Use of exhaust waste heat from diesel engine to produce drinking water from the sub-soil brine.
2. Recognising that the diesel engines operate 24×7 during salt manufacturing season and that 1.5-2 liters of water production per hour would enable sufficient water to be produced from a single unit over a day to cater to the drinking and cooking water needs of a small family— typically the family that operates the salt works.
3. Design of system such that it does not in any way affect the functioning of the diesel engine or its efficiency and relies only on heat transfer from hot gas to brine via a heat exchanger.
4. Minimising the volume of brine in the trapezoidal basin and yet maintaining a steady and sufficient water output by continuously dripping brine into the system at the same rate as water is taken out.
5. Undertaking suitable computation and designing the heat exchanger with parallel arrangement of copper tubes to maximise surface area and heat transfer.
6. Maintaining complete air seal between evaporator and condenser through use of a bent pipe which allows water to be taken out without escape of vapour from inside to outside and entry of air from outside to inside.
7. Maximizing the evaporation area in the evaporator and the vapour condensation area in the condenser.
8. Sprinkling the relatively cool sub-soil brine as it is pumped over the condenser to facilitate the condensation process.
9. Collecting the condensed water in an earthen goblet to keep it cold and to give a refreshing taste.
10. Recognising that it takes only 10 minutes or so to heat up the brine and providing two additional valves in the unit to allow for intermittent flushing of the unit with fresh brine and thereby prevent build up of dissolved solids in the brine beyond a point.
11. Allowing such flushing option either through manual operation or through a timer-controlled action.
12. Ensuring cost-effectiveness of the device so that it is affordable to the common man.

The desalination unit is designed by selecting the copper tubes diameter (inner and outer) and using heat transfer equations (1-13). Finally, the length of copper tubes (pipes) was determined and based on it a unit is designed and constructed for desalination of sub-soil brine.

The copper tubes are taken as existing diameter in institute and according to size of the unit. The internal and outer diameters of copper tube are as under:

$d_i = 0.0125$ m; $d_o = 0.0155$ m

The mass flow rate of exhaust gas is calculated from specifications of 5 hp diesel engine.

$m_e = 0.007147$ kg/s

Thermal conductivity of pure copper metal $K_{copper} = 386$ W/m° C.

Measured temperature of exhaust gas from diesel engine is: $T_{e(in)} = 150°$ C.

Assuming the temperature of the exhaust gas of diesel engine after it passes from the heat exchanger tubes means final temperature of the exhaust gas is: $T_{e(out)} = 50°$ C.

Taking fouling resistance for sea water and exhaust gas respectively are:

$Rf_o = 0.000088$ m²° C./W; $Rf_i = 0.001761$ m²° C./W

Properties of Exhaust gas at mean temperature $$\frac{T_{e(in)} + T_{e(out)}}{2} = \frac{150 + 50}{2} = 100° \text{ C.}$$

Here taking properties of $CO_2$ at 100° C. (reference: William Janna, page 405)

$\rho_e = 1.4393$ kg/m³; $Cp_e = 916.7$ J/kg° C.; $\mu_e = 1.827 \times 10^{-5}$ kg/ms; $k_e = 2.224 \times 10^{-2}$ W/m° C.;

$Pr_e = 0.75$

Properties of Water at Saturation Temperature 100° C.:

$\rho_1 = 957$ kg/m³; $\rho_v = 0.6$ kg/m³; $h_{fg} = 2257 \times 10^3$ J/kg; $Cp_1 = 4217$ J/kg° C.; $\mu_1 = 2.82 \times 10^{-4}$ kg/ms; $k_1 = 0.68$ W/m° C.; $Pr_1 = 1.75$ $$Q_{boiling} = \mu_e \times Cp_e \times \Delta T \quad (1)$$
$$= \mu_e \times Cp_e \times [T_{e(in)} - T_{e(out)}]$$
$$= 0.007147 \times 916.7 \times [150 - 50]$$
$$= 655.165 \text{ W}$$

Taking loss factor 0.7, Now $Q_{boiling} = 458.615$ W

Water Evaporation Rate:

$$\dot{m}_{evap} = \frac{Q_{boiling}}{h_{fg(l)}} \quad (2)$$
$$= \frac{458.615}{2254 \times 10^3}$$
$$= 0.00020 \text{ kg/s}$$
$$= 0.732 \text{ kg/hr}$$

Surface Area of Tube:

$$A_s = \pi d_o \quad (3)$$
$$= \pi \times 0.0155$$
$$= 0.04869 \text{ m}^2$$

$$Q_{nucliate} = \frac{Q_{boiling}}{A_s} \quad (4)$$
$$= \frac{655.165}{0.04869}$$
$$= 13455.8 \text{ W}$$

Heat Transfer Co-Efficient Outside Tube:

$$h_o = \frac{Q_{nucliate}}{T_s - T_{sat}} \quad (5)$$
$$= \frac{13455.8}{50}$$
$$= 269.11 \text{ W/m}^{2\circ} \text{ C.}$$

Cross section Area of Tube:

$$A_p = \frac{\pi}{4} d_i^2 \quad (6)$$
$$= \frac{\pi}{4} 0.0125^2$$
$$= 0.0001227 \text{ m}^2$$

Velocity of Exhaust Gas in Pipe:

$$V_p = \frac{m_e}{A_p \times \rho_e} \quad (7)$$
$$= \frac{0.007147}{0.0001227 \times 1.4393}$$
$$= 40.46 \text{ m/s}$$

Reynold Number of Exhaust Gas:

$$Re_e = \frac{\rho_e \times V_p \times d_i}{\mu_e} \quad (8)$$
$$= \frac{1.4393 \times 40.4634 \times 0.0125}{1.827 \times 10^{-5}}$$
$$= 39846$$

Nusselt Number of exhaust Gas [Sadik Kakac, Design of Heat exchanger, pg-97]:

$$Nu_e = 5 + [0.012 \times Re_e^{0.083} \times (Pr + 0.29)] \quad (9)$$
$$= 5 + [0.012 \times 39846^{0.83} \times (0.75 + 0.29)]$$
$$= 87.14$$

Heat Transfer Co-Efficient Inside Tube:

$$\frac{Nu_e \times k_e}{d_i} = \frac{87.14 \times 1.827 \times 10^{-5}}{0.0125} \quad (10)$$
$$= 155.03 \text{ W/m}^{2\circ} \text{ C.}$$

Overall Heat Transfer Co-Efficient:

$$\frac{1}{U_f} = \frac{d_o}{d_i h_i} + \frac{d_o Rf_i}{d_i} + \frac{d_o \ln\left(\frac{d_o}{d_i}\right)}{2K_{copper}} + Rf_0 + \frac{1}{h_o} \quad (11)$$
$$= \frac{0.0155}{0.0125 \times 155.03} + \frac{0.0155 \times 0.001761}{0.0125} +$$
$$\frac{0.0155 \ln\left(\frac{0.0155}{0.0125}\right)}{2 \times 386} + 0.000088 + \frac{1}{269.11}$$
$$= 1.40 \times 10^{-2} \text{m}^{2\circ} \text{ C./W} \Rightarrow U_f$$
$$= \frac{1}{\frac{1}{U_f}}$$
$$= 71.478 \text{ W/m}^{2\circ} \text{ C.}$$

Total Surface Area we Get:

$$A_o = \frac{Q_{boiling}}{U_f \Delta T} \quad (12)$$
$$= \frac{655.165}{71.478 \times 50}$$
$$= 0.1833 \text{ m}^2$$

Length of Tube:

$$L = \frac{A_o}{\pi d_o} \quad (13)$$
$$= \frac{0.1833}{\pi \times 0.0155}$$
$$= 3.8 \text{ m}$$
$$\approx 4 \text{ m}$$

EXAMPLES

The following example is given by way of illustration of the working of the invention in actual practice and should not be construed to limit the scope of the present invention in any way.

Example 1

The experiments to measure the temperature of sub-soil brine in the trapezoidal basin were conducted in an open system. During these experiments the 5 HP diesel engine was running without pump (load). The exhaust gas was passed through the nine copper tubes installed in the basin for heat transfer to the sub-soil brine. The temperature of sub-soil brine across the length of the basin without condensing unit was measured using four point digital thermocouples namely, T1, T2, T3, and T4. All thermocouples were installed in the basin to measure sub-soil brine temperature. The first two thermocouples T1 and T2 were installed at 50 mm and 100 mm distance, respectively, from the inlet of exhaust gas to the basin, while next two thermocouples were installed at equal distance of 150 mm. The temperature readings of the thermocouples were recorded after every 5 minutes intervals of time.

Before starting the diesel engine the temperature of the sub-soil brine was recorded to be 28° C. After starting the diesel engine temperature after every 5 minutes time interval was measured and recorded in Table 2 for all four thermocouples. After 15 minutes the temperature of sub-soil brine reached to 53° C., 52° C., 49° C. and 48° C. for T1, T2, T3, and T4 thermocouples, respectively (Table 2). The temperature readings of all thermocouples with respect to time are presented graphically in FIG. 5. The temperature of the feed brine increased rapidly over the first 15 minutes and reached a steady temperature of 74° C. after 40 minutes.

TABLE 2

Sub-soil brine temperature without condensing unit (Open system)

| | | Time, min | | | | | | | | | |
|---|---|---|---|---|---|---|---|---|---|---|---|
| | | 0 | 15 | 20 | 25 | 30 | 35 | 40 | 45 | 50 | 55 |
| Thermocouple | T1 | 28 | 53 | 58 | 61 | 66 | 68 | 69 | 71 | 74 | 73 |
| Temperature | T2 | 28 | 52 | 56 | 61 | 65 | 68 | 69 | 70 | 73 | 72 |
| ° C. | T3 | 28 | 49 | 55 | 60 | 65 | 67 | 68 | 69 | 72 | 70 |
| | T4 | 28 | 48 | 54 | 59 | 64 | 66 | 67 | 68 | 71 | 69 |

This example reveals that exhaust heat from the diesel engine can be gainfully utilized to raise the temperature of sub-soil brine and that when the experiment is conducted in an open system without condenser; the brine reaches a maximum temperature in the range of 69-74° C.

Example 2

Figure 6:
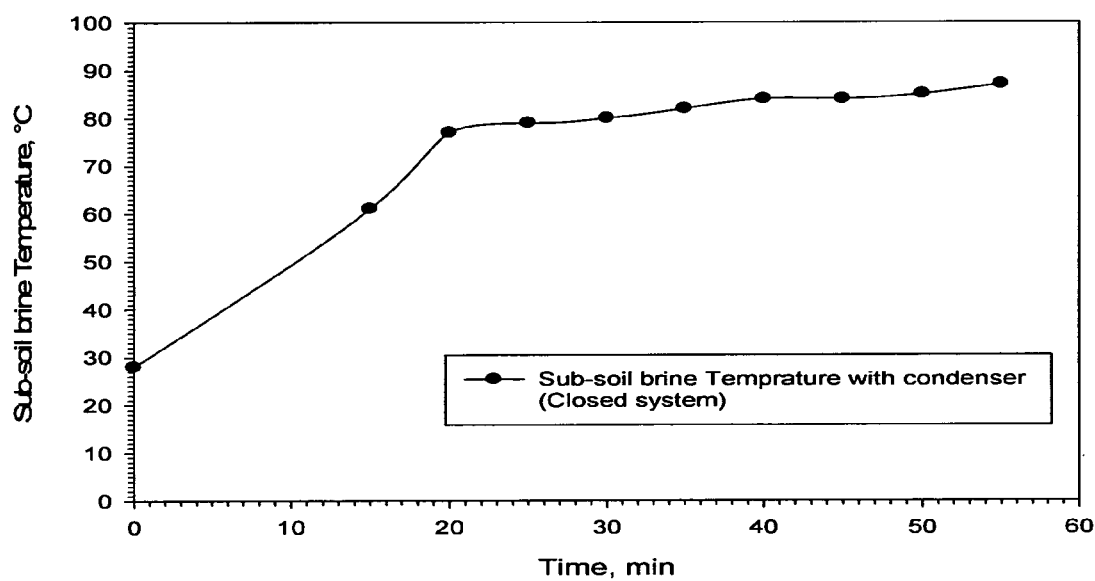

The condensing unit was fixed on the trapezoidal basin to make it a closed system and a single thermocouple was inserted at the centre of the basin to measure the sub-soil brine temperature. Before starting the diesel engine, the sub-soil brine temperature was recorded to be 28° C. as in Example 1. It can be seen from the data of Table 3 that the maximum temperature recorded was 87° C. after 55 minutes and that this temperature remained almost constant with time (see FIG. 6).

TABLE 3

Sub-soil brine temperature with condensing unit (Closed unit)

| | Time, Min | | | | | | | | | |
|---|---|---|---|---|---|---|---|---|---|---|
| | 0 | 15 | 20 | 25 | 30 | 35 | 40 | 45 | 50 | 55 |
| Temperature, ° C. | 28 | 61 | 77 | 79 | 80 | 82 | 84 | 84 | 85 | 87 |

This example reveals that the temperature of sub-soil brine in the trapezoidal basin could be increased up to 87° C. by creating a closed system with the further benefit that the evaporated water can be condensed to recover drinking water as illustrated by the further examples below.

Example 3

Figure 7:
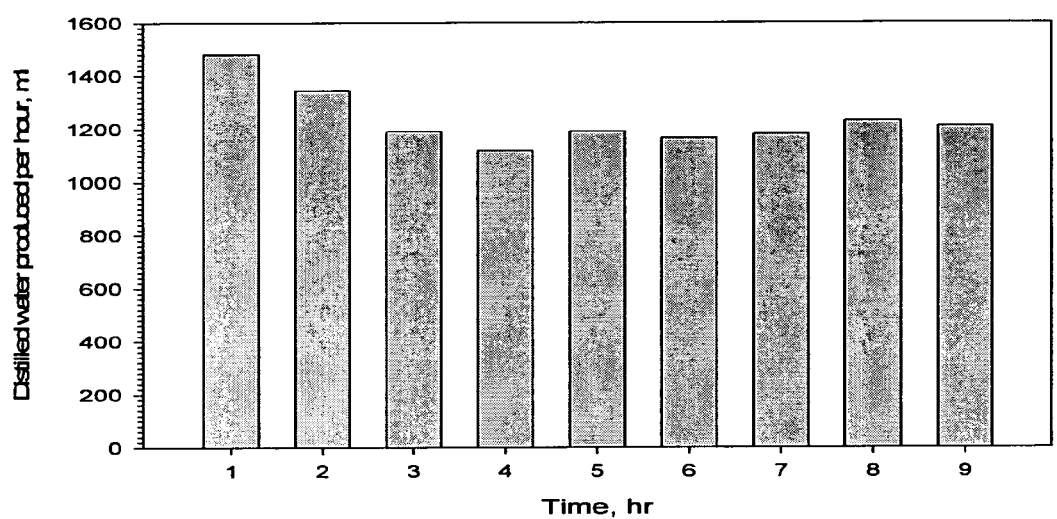

An experiment was started at 8:00 am utilizing the assembly of Example 2. After 15 min of operation, condensed water began to flow out from the tube attached to the condensing unit. Once the rate of distilled water was stabilized the quantity of collected water was measured after every 15 min time interval for 9 hours. The quantity of collected water after every hour is given in Table 4 and graphically presented in FIG. 7. During continuous nine hours working, it was observed that the average production of potable water was 1.2 liters per hour.

TABLE 4

Production rate of distilled (potable) water

| | Time, min | | Distilled |
|---|---|---|---|
| Sr. No. | From | To | water, ml |
| 1 | 8.30 | 9.30 | 1480 |
| 2 | 9.30 | 10.30 | 1345 |
| 3 | 10.30 | 11.30 | 1190 |
| 4 | 11.30 | 12.30 | 1120 |
| 5 | 12.30 | 1.30 | 1190 |
| 6 | 1.30 | 2.30 | 1165 |
| 7 | 2.30 | 3.30 | 1180 |
| 8 | 3.30 | 4.30 | 1230 |
| 9 | 4.30 | 5.30 | 1210 |

This example teaches us that the unit is capable of producing 1.2 liters of distilled water per hour from sub-soil brine as feed using the exhaust heat from the diesel engine and that the same feed also suffices for the purpose of condensation.

Example 4

The samples of distilled water produced were collected for analytical testing. The total dissolved solid of the collected water sample was measured to be in the range of 180-250 ppm. The pH was monitored only for one sample and found to be 8.1. This example teaches us the production of potable water from highly saline sub-soil brine.

Example 5

After the experiment of Example 3, it was observed that a lot of salt had deposited on the copper tubes and also in the trapezoidal basin and even on the outer surface of the condenser. The latter was on account of spraying of the brine on the condenser unit. In a subsequent experiment the sub-soil brine was flushed out from the trapezoidal basin after every 4 hours of operation. With this simple preventive maintenance the deposition of salt could be avoided leading to more consistent and durable performance.

ADVANTAGES OF THE PRESENT INVENTION

1. The desalination unit is able to produce potable water from sub-soil brine using exhaust heat from 5 HP air cooled diesel engine.
2. The unit works on only exhaust heat energy and no extra energy source is required.
3. The desalination unit is a reliable source of drinking water in the remote areas.
4. The unit can be installed, operated and maintained by a person of ordinary skill
5. The unit can be operated round the clock without changing any performance of diesel engine.
6. The unit entails no operational cost although some time may be invested to flush out and clean the unit occasionally.

7. The desalination unit of the present invention facilitate the heat transfer without any back pressure at the exhaust heat pipe of the heat source.
8. The desalination unit of the present invention is capable to produce potable water in the range of 1.5 to 2.0 liters per hour.
9. The desalination unit of the present invention is cost effective, rugged and amenable to operate and easy to maintenance.

We claim:

1. A desalination unit for production of potable water from sub-soil brine, the unit comprising:
   an evaporator in the form of a trapezoidal basin for containing the sub-soil brine;
   a heat exchanger comprising a plurality of horizontal metallic pipes disposed inside the basin and parallel to the length of the basin; the metallic pipes of the heat exchanger are configured to be coupled to an exhaust port of a heat source via an exhaust heat pipe to receive hot exhaust gases and transfer the heat to the brine contained in the basin thereby resulting in vaporization of the sub-soil brine;
   a feed tank coupled with the trapezoidal basin for maintaining level of sub-soil brine in the trapezoidal basin;
   a flush valve provided at bottom of the trapezoidal basin for draining a concentrated sub-soil brine;
   a condenser comprising a top wall and side walls, being mounted on top of the trapezoidal basin so as form a closed chamber over the basin to trap the vapor produced from the sub-soil brine; the side walls of the condenser are constructed so that the condenser have a variable cross section with increasing cross-sectional area from bottom to top;
   a sprinkling system disposed on outer surface of the top wall of the condenser for spraying subsoil brine to make the condenser cool;
   a water collecting channel being disposed horizontally on inner surface of the side walls of the condenser for collecting water.

2. The desalination unit as claimed in claim 1, wherein the metallic pipes are coupled with a header that is connected to the exhaust pipe whose one end is configured to be connected with the exhaust port of the heat source and other end is connected to the header.

3. The desalination unit as claimed in claim 1, wherein the feed tank maintains the level of sub-soil brine in the basin by difference in level.

4. The desalination unit as claimed in claim 1, wherein the condenser sprinkling system comprises a pipe with plurality of holes, the pipe is disposed on outer surface of the top wall of condenser for sprinkling brine on the top wall of the condenser for cooling the walls condenser during condensation.

5. The desalination unit as claimed in claim 1, wherein the water collecting channel is connected with a horizontal pipe for taking out potable water from the condenser.

6. The desalination unit as claimed in claim 1, wherein the heat source is an air cooled diesel engine.

7. The desalination unit as claimed in claim 1, wherein the metallic pipes are thermally conducting pipes being arranged in parallel or concentric form.

8. The desalination unit as claimed in claim 7, wherein the thermally conducting pipes are made of material selected from the group consisting of copper, stainless steel and aluminum.

9. The desalination unit as claimed in claim 7, wherein the length to diameter ratio of the thermally conducting pipes is in a range of 300 to 400.

* * * * *